United States Patent
Yang (10) Patent No.: US 8,553,592 B2
(45) Date of Patent: *Oct. 8, 2013

(54) MULTI-RADIO COMMUNICATION DEVICE AND METHOD FOR ENABLING COEXISTENCE BETWEEN A BLUETOOTH TRANSCEIVER AND A WIMAX TRANSCEIVER OPERATING IN FDD MODE

(75) Inventor: Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 12/425,795

(22) Filed: Apr. 17, 2009

(65) Prior Publication Data

US 2010/0265856 A1 Oct. 21, 2010

(51) Int. Cl.
    *H04J 1/00* (2006.01)
(52) U.S. Cl.
    USPC .......................................... 370/281
(58) Field of Classification Search
    USPC .......................................... 370/281
    See application file for complete search history.

(56) References Cited

U.S. PATENT DOCUMENTS

| | | |
|---|---|---|
| 2006/0245401 A1 | 11/2006 | Fischer et al. |
| 2008/0123610 A1* | 5/2008 | Desai et al. ............. 370/339 |
| 2008/0192622 A1* | 8/2008 | Scheim et al. ........... 370/210 |
| 2008/0220788 A1 | 9/2008 | Stanwood et al. |
| 2008/0233875 A1* | 9/2008 | Desai et al. ............. 455/41.2 |
| 2009/0040974 A1 | 2/2009 | Goldhamer |
| 2009/0081962 A1* | 3/2009 | Sohrabi ................... 455/79 |
| 2009/0252128 A1* | 10/2009 | Yang et al. ............... 370/338 |
| 2010/0046498 A1* | 2/2010 | Hall ......................... 370/350 |
| 2010/0056136 A1* | 3/2010 | Zhu ......................... 455/426.1 |
| 2010/0061326 A1* | 3/2010 | Lee et al. ................ 370/329 |
| 2010/0075600 A1* | 3/2010 | Haartsen ................. 455/41.2 |

FOREIGN PATENT DOCUMENTS

| | | |
|---|---|---|
| CN | 102461328 | 5/2012 |
| WO | WO-2010120605 A2 | 10/2010 |
| WO | WO-2010120605 A3 | 10/2010 |

OTHER PUBLICATIONS

"International Application Serial No. PCT/US2010/030232, Search Report mailed Nov. 26, 2010", 3 pgs.

"International Application Serial No. PCT/US2010/030232, Written Opinion mailed Nov. 26, 2010", 4 pgs.

Zhu, Jing, et al., "Proposed Text for the IEEE 802.16m Amendment on Multi-Radio Coexistence", http://ieee802.org/16, (Mar. 2, 2009), 6 pgs.

"International Application Serial No. PCT/US2010/030232, International Preliminary Report on Patentability mailed Oct. 27, 2011", 6 pgs.

\* cited by examiner

*Primary Examiner* — Mark Rinehart
*Assistant Examiner* — Christopher R Crompton
(74) *Attorney, Agent, or Firm* — Schwegman, Lundberg & Woessner, P.A.

(57) ABSTRACT

Embodiments of a multi-radio communication device and method for enabling coexistence between a Bluetooth transceiver and a broadband wireless access network (BWAN) transceiver are generally described herein. In some embodiments, the BWAN transceiver is configured to transmit a reservation request to a BWAN base station to reserve an amount of time during which no uplink transmissions are scheduled. The reservation request is configured to allow the Bluetooth transceiver to receive packets from a Bluetooth device without interference from transmissions by the BWAN transceiver.

19 Claims, 7 Drawing Sheets

ILLUSTRATION OF CONFLICTING TRANSMISSIONS AND RECEPTIONS

FIG. 5

SIMULTANEOUS OPERATIONS

MULTI-RADIO COMMUNICATION DEVICE AND METHOD FOR ENABLING COEXISTENCE BETWEEN A BLUETOOTH TRANSCEIVER AND A WIMAX TRANSCEIVER OPERATING IN FDD MODE

TECHNICAL FIELD

Embodiments pertain to wireless communications. Some embodiments pertain to multi-radio communication devices, such as devices that include both a Worldwide Interoperability for Microwave Access (WiMAX) transceiver and a Bluetooth (BT) transceiver. Some embodiments pertain to WiMAX transceivers that operate in a frequency division diplexing (FDD) mode. Some embodiments pertain to multi-radio communication devices that include both a $3^{rd}$ Generation Partnership Project (3GPP) Universal Terrestrial Radio Access Network (UTRAN) Long-Term-Evolution (LTE) transceiver and a Bluetooth transceiver.

BACKGROUND

Many wireless communication devices today include more than one radio transceiver for communicating with different networks and different devices in accordance with various communication standards and techniques. One issue with these multi-radio communication devices is that the transmission of one transceiver may interfere with the receptions of another transceiver. For example, when a multi-radio communication device includes a WiMAX transceiver and Bluetooth transceiver, transmissions by the WiMAX transceiver may make it extremely difficult for the Bluetooth transceiver to receive. This is particularly an issue when the transmissions by the WiMAX transceiver are close in frequency to the operating frequency of the Bluetooth transceiver. This is the case for WiMAX transceivers that operate in FDD mode. The inability of a Bluetooth transceiver to receive is particularly an issue because of the traffic pattern utilized by Bluetooth transceivers.

Thus, there are general needs for multi-radio communication devices and methods that help reduce conflicts between the co-located transceivers.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
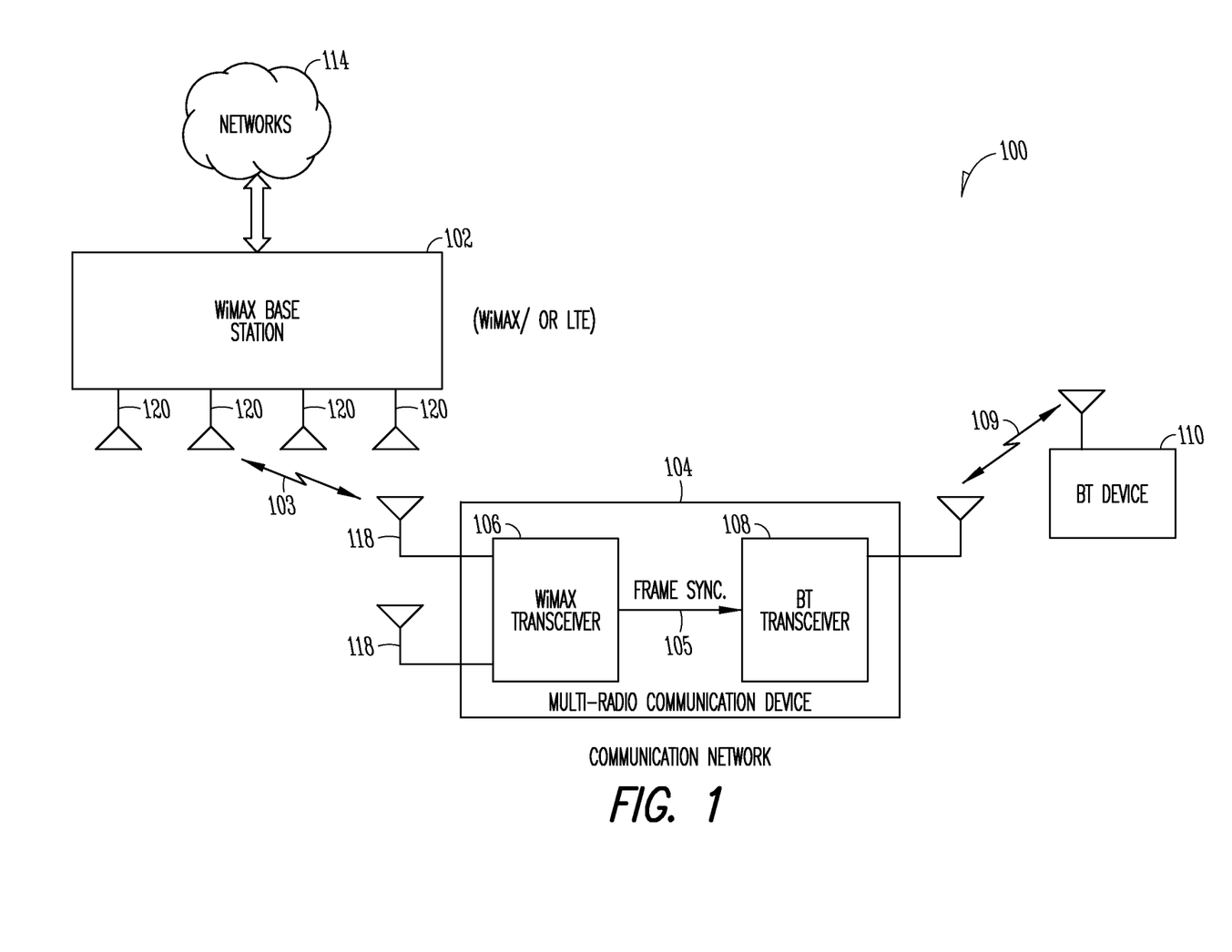
FIG. 1 is illustrates a communication network including a multi-radio communication device in accordance with some embodiments.

FIG. 1 is illustrates a communication network including a multi-radio communication device in accordance with some embodiments. Communication network 100 includes a WiMAX base station 102, a multi-radio communication device 104 and a Bluetooth (BT) wireless device 110. The multi-radio communication device 104 includes a WiMAX transceiver 106 for communicating with the WiMAX base station 102 using WiMAX frames 103. WiMAX frames 103 may include both uplink frames and downlink frames. The WiMAX base station 102 may be coupled with one or more networks 101, such as the Internet or the telephone network to provide communications between the networks 101 and the multi-radio communication device 104, although this is not a requirement.

The multi-radio communication device 104 also includes a Bluetooth transceiver 108 for communicating with one or more Bluetooth devices, such as Bluetooth device 110. The Bluetooth transceiver 108 may, among other things, discover the Bluetooth device 110, establish a connection with the Bluetooth device 110, and communicate with the Bluetooth device 110 in accordance with a Bluetooth protocol and operating profile. In some embodiments, Bluetooth transceiver 108 operates as a master device and the Bluetooth device 110 operates as a slave device, however this is not a requirement as embodiments are also application to situations in which Bluetooth transceiver 108 operates as a slave device and the Bluetooth device 110 operates as a mater device. In these embodiments, the master device polls the slave device to determine whether or not the slave device has data to send.

In accordance with some embodiments, the WiMAX transceiver 106 is configured to transmit a reservation request to the WiMAX base station 102 to reserve an amount of time during which no uplink transmissions are scheduled by the WiMAX transceiver 106. The reservation request is configured to allow the Bluetooth transceiver 108 to receive signals 109 including packets from the Bluetooth device 110 without interference from transmissions by the WiMAX transceiver 106. These embodiments are described in more detail below.

In some embodiments, the WiMAX transceiver 106 is configured to reserve at least two non-contiguous subframes within each WiMAX uplink frame. The WiMAX transceiver 106 may provide a frame-sync signal 105 to the Bluetooth transceiver 108 to indicate a start time of one of the reserved subframes in each WiMAX uplink frame. The Bluetooth transceiver 108 may be configured to align a boundary of a receiving slot with the frame-sync signal 105 to allow interference-free reception of Bluetooth signals 109 within the Bluetooth receiving slots that occur during the reserved WiMAX subframes. These embodiments are also described in more detail below.

In some embodiments, the WiMAX base station 102 and the WiMAX transceiver 106 may communicate in accordance with a frequency-division diplexing (FDD) mode, while in other embodiments, the WiMAX base station 102 and the WiMAX transceiver 106 may communicate in accordance with a time-division diplexing (TDD) mode. When operating in the FDD mode, downlink and uplink transmissions between the WiMAX transceiver 106 and the WiMAX base station 102 use separate frequency spectrums. The frequency range of the uplink transmissions may be proximate to the operating frequency of the Bluetooth transceiver 108 potentially resulting in severe interference with concurrent receptions by the Bluetooth transceiver 108. In TDD embodiments of the WiMAX transceiver 106, the Bluetooth transceiver 108 may also align a boundary of a receiving slot with the framesync signal 105 to allow interference-free reception of Bluetooth signals 109 within Bluetooth receiving slots that occur during the reserved subframes.

In some embodiments, the WiMAX base station 102 and the WiMAX transceiver 106 may be configured to transmit and receive orthogonal frequency division multiplexed (OFDM) communication signals in accordance with an orthogonal frequency division multiple access (OFDMA) communication technique. The OFDM communication signals may comprise a plurality of orthogonal subcarriers. In these embodiments, the WiMAX base station 102 and the WiMAX transceiver 106 may be configured to communicate in accordance with specific communication standards, such as the Institute of Electrical and Electronics Engineers (IEEE) 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. In some embodiments, the WiMAX base station 102 and the WiMAX transceiver 106 may be configured to communicate in accordance with an IEEE 802.16(m) proposed standards when operating in an FDD mode. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

The term Bluetooth, as used herein, may refer to a short-range digital communication protocol including a short-haul wireless protocol frequency-hopping spread-spectrum (FHSS) communication technique operating in the 2.4 GHz spectrum. Although several embodiments are described herein with respect to Bluetooth, the scope of the disclosure is not limited in this respect.

Although several embodiments are described herein as relevant to WiMAX transceivers and base stations, the scope of the disclosure is not limited in this respect. Other embodiments are applicable to transceivers and base stations that communicate in accordance with the 3GPP UTRAN-LTE communication standards. In these embodiments, an LTE transceiver is configured to transmit a reservation request to an LTE base station to reserve an amount of time during which no uplink transmissions are scheduled by the LTE transceiver. The reservation request is configured to allow a co-located Bluetooth transceiver to receive signals from a Bluetooth device without interference from transmissions by the LTE transceiver. For more information with respect to 3GPP UTRAN-LTE standards, see the 3GPP standards for UTRAN-LTE, release 8, March 2008, including variations and evolutions thereof.

In some embodiments, multi-radio communication device 104 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

As illustrated in FIG. 1, the WiMAX base station 102 and the WiMAX transceiver 106 may use antennas 118 and 120 to communicate. Antennas 118 and 120 may comprise one or more directional or omnidirectional antennas, including, for example, dipole antennas, monopole antennas, patch antennas, loop antennas, microstrip antennas or other types of antennas suitable for transmission of radio-frequency (RF) signals. In some embodiments, instead of two or more antennas, a single antenna with multiple apertures may be used. In these embodiments, each aperture may be considered a separate antenna. In some multiple-input, multiple-output (MIMO embodiments), antennas 118 and 120 may be effectively separated to take advantage of spatial diversity and the different channel characteristics that may result.

Although multi-radio communication device 104 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of multi-radio communication device 104 may refer to one or more processes operating on one or more processing elements.

Figure 2:
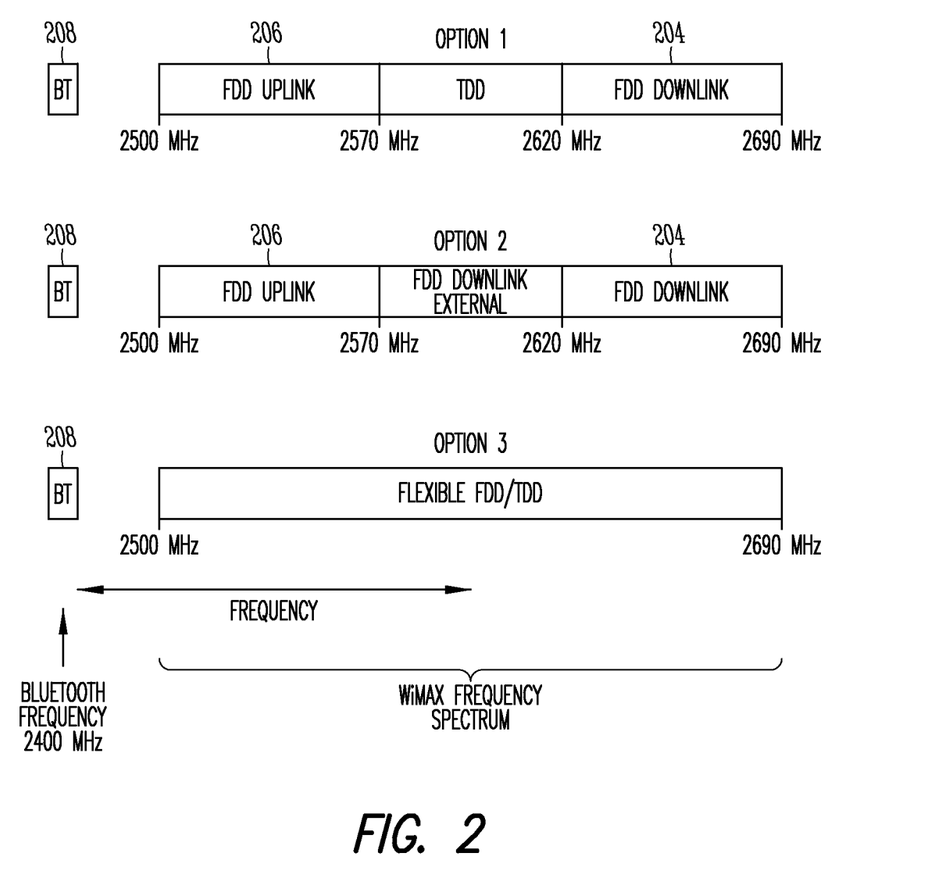
FIG. 2 illustrates frequency spectrum usage of a WiMAX transceiver operating in FDD mode and a Bluetooth transceiver.

FIG. 2 illustrates frequency spectrum usage of a WiMAX transceiver operating in FDD mode and a Bluetooth transceiver, such as the WiMAX transceiver 106 (FIG. 1) and the Bluetooth transceiver 108 (FIG. 1). The frequency spectrum usage for several options for operating a WiMAX transceiver operating in FDD mode is illustrated.

In these embodiments, when operating in FDD mode, the WiMAX transceiver 106 communicates with the WiMAX base station 102 over an FDD communication link comprising an FDD downlink 204 and an FDD uplink 206. The FDD downlink 204 may utilize a FDD downlink frequency range for downlink transmissions (i.e., transmission from the base station 102). The FDD uplink may utilize an FDD uplink frequency range for uplink transmissions (i.e., transmissions to the base station 102). The Bluetooth transceiver 108 communicates with the Bluetooth device 110 (FIG. 1) using a Bluetooth operating frequency 208. The Bluetooth operating frequency 208 may be significantly closer to the FDD uplink frequency range than the FDD downlink frequency range as illustrated in FIG. 2 such that uplink transmissions from the WiMAX transceiver 106 would severely interfere with concurrent receptions by the Bluetooth transceiver 108. In some embodiments, the FDD uplink frequency range may range from 2500 MHz to 2570 MHz, and the FDD downlink frequency range may range from 2620 MHz to 2690 MHz. In these embodiments, the frequency range from 2570 MHz to 2620 MHz may be used for other operations of the WiMAX transceiver 106.

Figure 3:
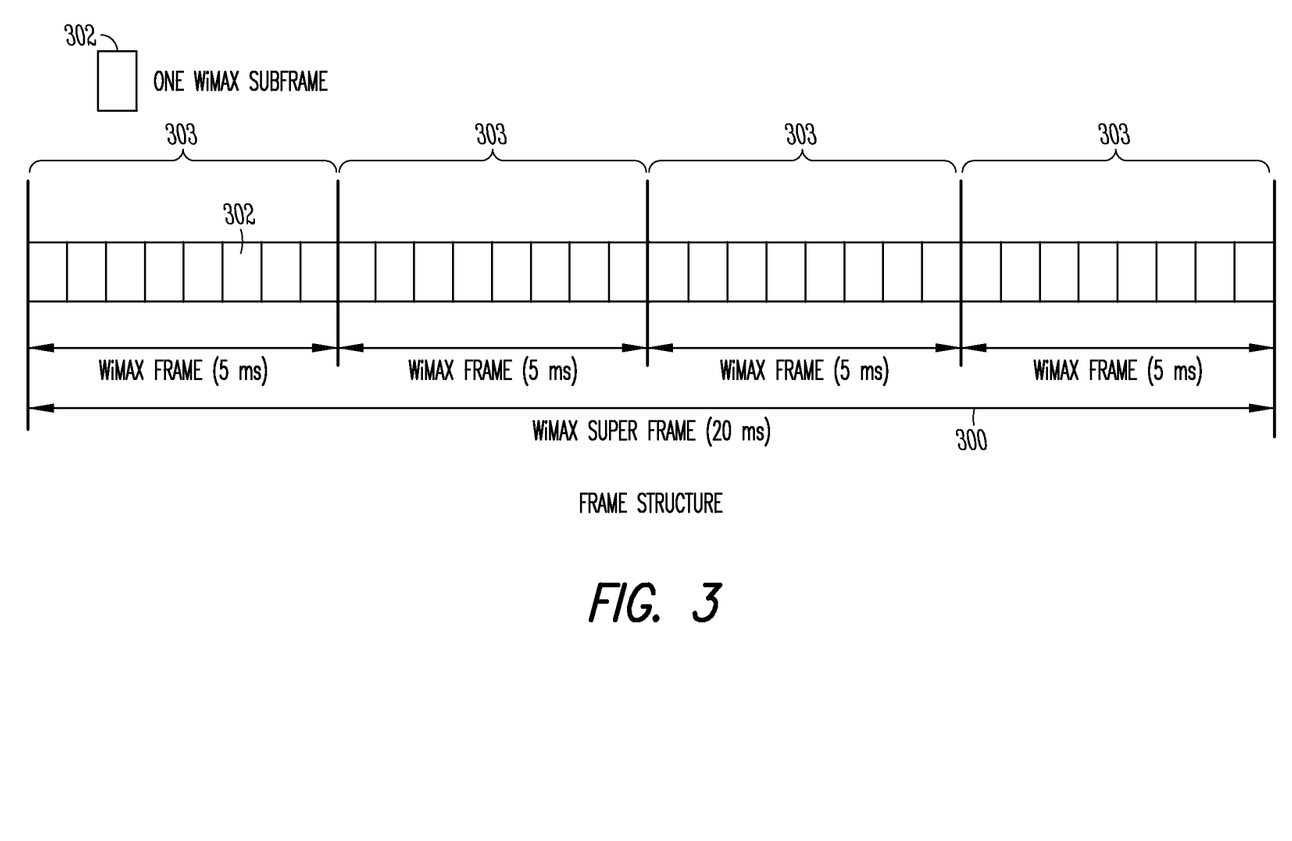
FIG. 3 illustrates a WiMAX frame structure in accordance with FDD mode.

FIG. 3 illustrates a WiMAX frame structure in accordance with FDD mode. The WiMAX frame structure illustrated in FIG. 3 may be suitable for both uplink and downlink communications between the WiMAX base station 102 (FIG. 1) and the WiMAX transceiver 106 (FIG. 1). Each WiMAX frame 303 may be provided within a WiMAX superframe 300 comprising several equally sized frames 303. Each frame 303 may comprise several equally sized subframes 302.

In accordance with some embodiments, the WiMAX transceiver 106 may reserve at least two non-contiguous subframes 302 within each uplink frame 303 to reserve time during which no uplink transmission are scheduled. The reservation of at least two non-contiguous subframes 302 within each uplink frame 303 allows the Bluetooth transceiver 108 (FIG. 1) to receive packets from the Bluetooth device 110 (FIG. 1) without interference from transmissions by the WiMAX transceiver 106.

In some embodiments, the WiMAX superframe 300 is a 20 millisecond (ms) superframe comprising four 5 ms frames 303. Each frame 303 may comprise eight equally sized subframes 302, although the scope of the embodiments is not limited in this respect.

Figure 4:
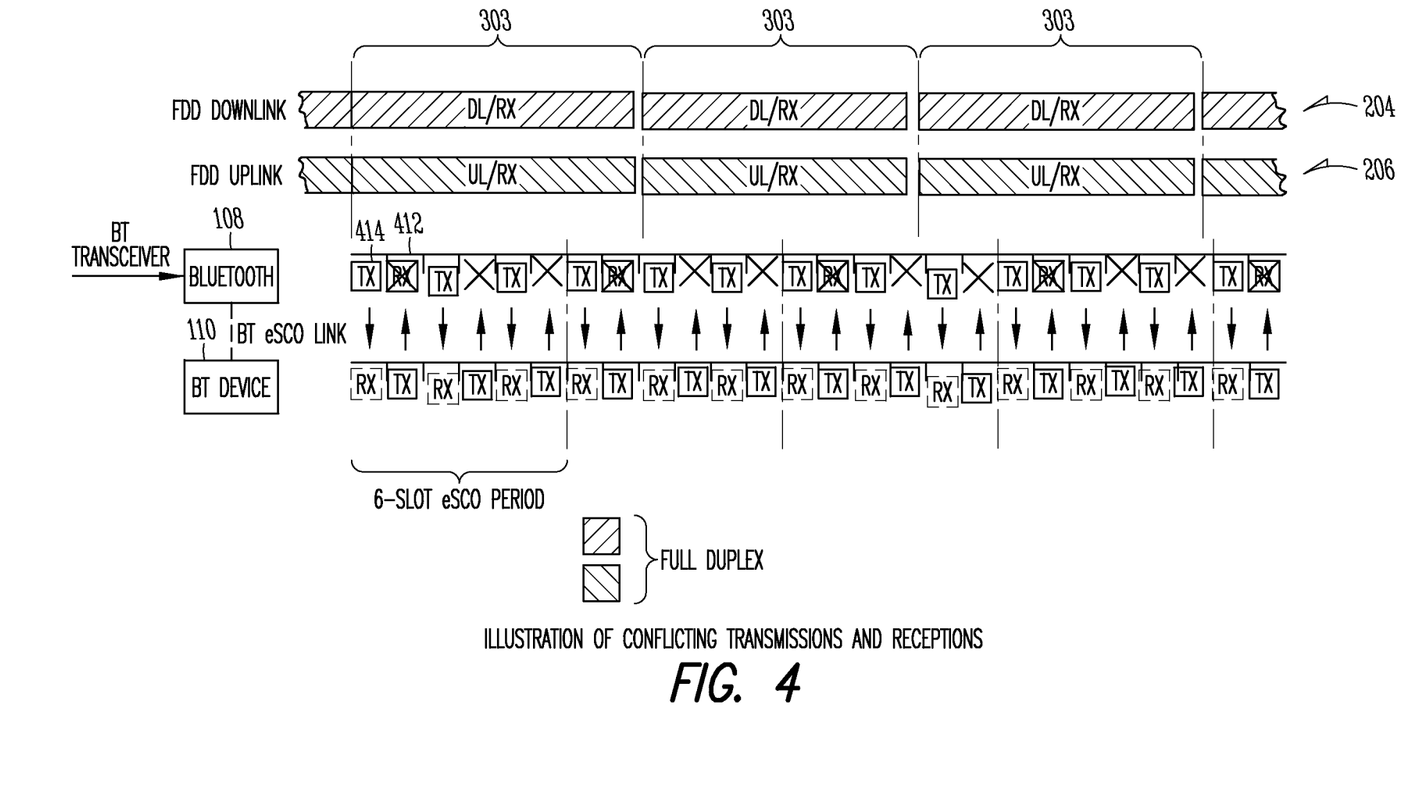
FIG. 4 illustrates conflicts between transmissions of a WiMAX transceiver and receptions by a co-located Bluetooth transceiver in accordance with some embodiments.

FIG. 4 illustrates conflicts between transmissions of a WiMAX transceiver and receptions by a co-located Bluetooth transceiver in accordance with some embodiments. The FDD downlink 204 and the FDD uplink 206 are illustrated in the time domain and provide for full duplex communications by the WiMAX transceiver 106 (FIG. 1) using WiMAX frames 303 in FDD mode. Accordingly, when operating in FDD mode, the WiMAX transceiver 106 is able to transmit within any uplink frame while concurrently receiving a data burst in a downlink frame. As illustrated in FIG. 4, the Bluetooth transceiver 108 may communicate over a synchronous link, such as an extended Synchronous Connection Oriented (eSCO) link. In these embodiments, Bluetooth transmissions from the Bluetooth device 110 may be received during Bluetooth receiving slots 412, and Bluetooth transmissions from the Bluetooth transceiver 108 to the Bluetooth device 110 may be transmitted during Bluetooth transmitting slots 414. Since the WiMAX transceiver 106 operating FDD duplex mode can transmit at any time, in a worst case scenario, interference from these uplink transmissions may occur in any and all Bluetooth receiving slots 412. Because transmissions by the WiMAX transceiver 106 may occur at any and all times on FDD uplink 206, it is possible that the Bluetooth transceiver 108 is unable to receive any of the Bluetooth packets during Bluetooth receiving slots 412.

Figure 5:
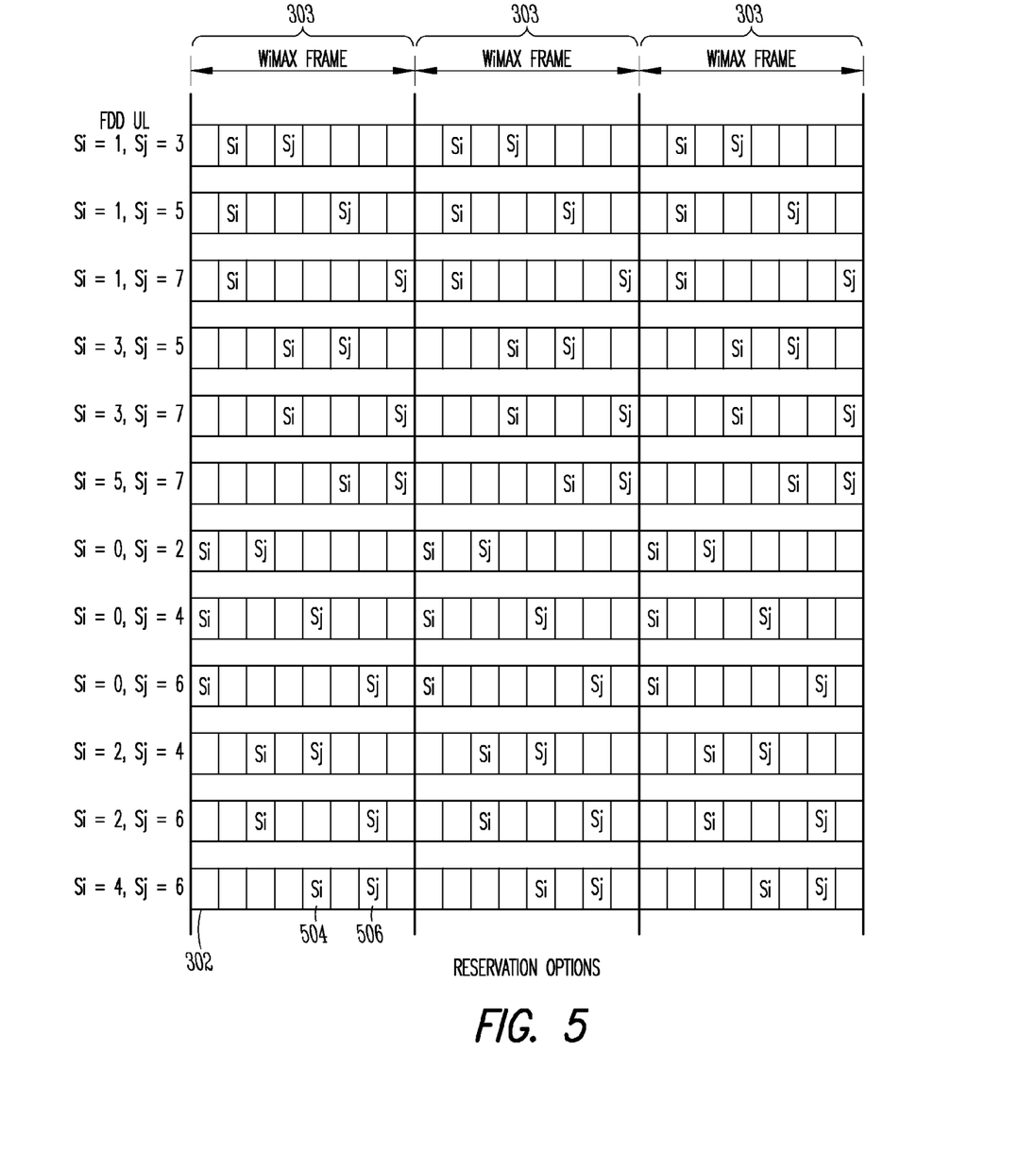
FIG. 5 illustrates subframe reservation options in accordance with some embodiments.

FIG. 5 illustrates subframe reservation options in accordance with some embodiments. As illustrated in FIG. 5, the WiMAX transceiver 106 (FIG. 1) may reserve at least two non-contiguous subframes 504, 506 (denoted $S_i$ and $S_j$) within each uplink frame 303. The two subframes 504, 506 that are reserved within each uplink frame 303 may be selected to be separated by an odd number of subframes (i.e., one, three or five subframes 302 such that $S_j-S_i=2$, 4 or 6).

In these embodiments, the reservation of at least two subframes 504, 506 may be periodic and configured to reserve the same corresponding two subframes within each uplink frame 303 of a superframe 300 (FIG. 3). In this way, the same reservation may repeat every frame 303 which may ease the scheduling burden of the WiMAX base station 102 (FIG. 1). The selection of at least two non-contiguous subframes 504, 506 in this manner allows the Bluetooth transceiver 108 (FIG. 1) to receive Bluetooth transmissions of both synchronous data and asynchronous data when operating in accordance with a Bluetooth protocol and operating profile. This is described in more detail below.

In some embodiments, the reservation schemes disclosed herein may reserve a minimum amount of time to allow the Bluetooth transceiver 108 to operate within different operational mode and profile without having to change the reservation. The reservation of at least two subframes in each uplink frame 303 as described herein may provide the minimum amount of time for the Bluetooth transceiver 108 to operate in several common usage scenarios. Such common usage scenarios may include using a synchronous link for conversational audio traffic and using an asynchronous link for audio streaming and peripheral devices. In accordance with the reservation of subframes as described herein, these common usage scenarios may be supported with the same reservation.

Figure 6:
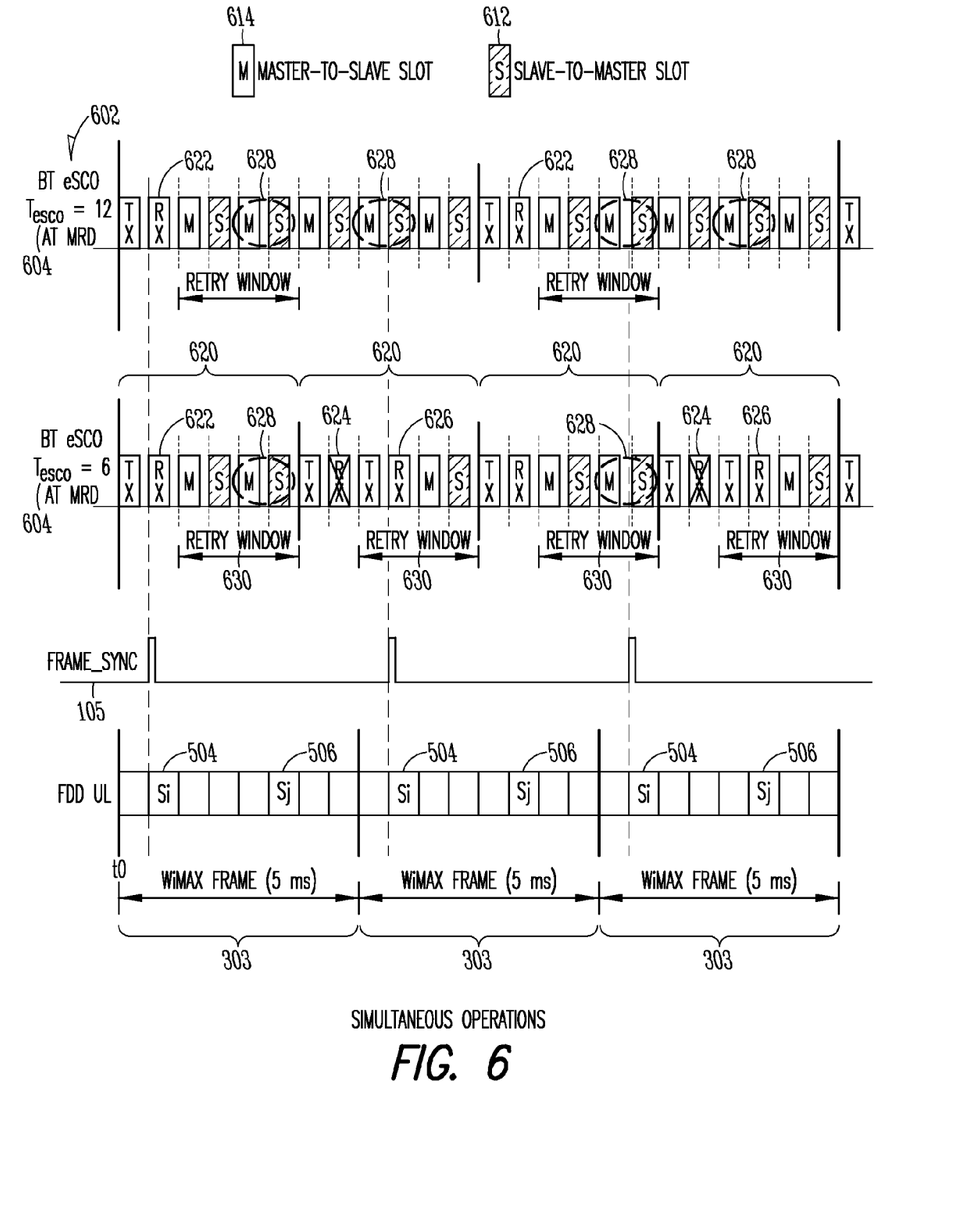
FIG. 6 illustrates simultaneous operations by a WiMAX transceiver operating in FDD mode and a Bluetooth transceiver in accordance with some embodiments.

FIG. 6 illustrates simultaneous operations by a WiMAX transceiver operating in FDD mode and a Bluetooth transceiver in accordance with some embodiments. As shown, a Bluetooth eSCO link 602 has an eSCO period of twelve Bluetooth slots, and a Bluetooth eSCO link 604 has an eSCO period of six Bluetooth slots. The Bluetooth slots include receiving slots 612 (designated with an S), which are slave-to-master slots. The Bluetooth slots also include transmitting slots 614 (designated with an M), which are master-to-slave slots. Receiving slots 612 correspond to receiving slots 412 (FIG. 4) and transmitting slots 614 correspond to transmitting slots 414 (FIG. 4). The WiMAX transceiver 106 (FIG. 1) may reserve at least two non-contiguous subframes 504, 506 within each uplink frame 303 and provide a frame-sync signal 105 to the Bluetooth transceiver 108 (FIG. 1) to indicate a start time of one of the reserved subframes, such as subframe 504, in each uplink frame 303. The Bluetooth transceiver 108 may align a boundary of a receiving slot 612, such as receiving slot 622, with the frame-sync signal 105 to allow interference-free reception of Bluetooth signals within Bluetooth receiving slots that occur during the reserved subframes 504, 506.

The Bluetooth eSCO link provides a synchronous link for synchronous data such as conversational audio using reserved master-to-slave eSCO slots (illustrated with a TX) and reserved slave-to-master reserved eSCO slots (illustrated with an RX). The period between these pairs of reservation slots is an eSCO period (Tesco) 620.

In some embodiments, each Bluetooth slot may be a 625 micro-second slot and eight Bluetooth slots are about the same duration as the duration of the WiMAX frame 103 (i.e., a single five millisecond WiMAX frame duration). In the example illustrated in FIG. 6, $S_i=1$ and $S_j=5$. In these embodiments, the WiMAX transceiver 106 operating in FDD mode reserves the $2^{nd}$ and the $6^{th}$ subframes in each frame 303 to help insure that the Bluetooth transceiver 108 can successfully receive. Both eSCO configurations (i.e., Tesco=6 and Tesco=12) provide retry windows 630 of four Bluetooth slots which may be used for eSCO link retransmissions. The retry windows 630 may be used for retransmissions of lost or damaged packets. For both of these eSCO configurations, master-to-slave and slave-to-master packets may be successfully delivered within every eSCO period. In addition, transmission opportunities remain for Bluetooth asynchronous communication link (ACL) traffic, which includes traffic to maintain the connection between the Bluetooth devices as well as for other type of asynchronous traffic.

In some embodiments, a first of the Bluetooth receiving slots in eSCO period 620 is a reserved slave-to-master slot (i.e., slot 622 or 624) that may be configured for reception of synchronous data, such as conversational audio. When the reserved slave-to-master slot, such as slot 624, does not occur within one of the reserved subframes 504, 506, a subsequent reserved slave-to-master slot, such as slot 626, is provided within one of the reserved subframes (i.e., subframe 504). The subsequent reserved slave-to-master slot may be associated with a retry window 630 and may occur during one of the reserved subframes (i.e., subframe 504). This allows for the retransmission of an unsuccessful transmission that occurred during reserved slave-to-master slot 624 which did not occur within one of the reserved subframes (either subframe 504 or 506). When a reserved slave-to-master slot (such as slot 622) does occur within one of a reserved subframes (i.e., either subframe 504, 506), the Bluetooth transceiver 108 may receive synchronous data within the reserved slave-to-master slot 622 without interference from uplink transmissions by the WiMAX transceiver 106.

In some embodiments, the reservation of at least two non-contiguous subframes within each uplink frame 303 provides opportunities of ACL communications 628 during one of the reserved subframes (i.e., either subframe 504, 506) without interfering transmissions by the WiMAX transceiver 106. As illustrated in FIG. 6, at least some of the opportunities for ACL communications 628 occur during the eSCO period 620. When synchronous data is being communicated, at least some of the opportunities for ACL communications 628 occur during the eSCO period 620 and after a successful reception of the synchronous data within the reserve slave-to-master slot (e.g., such as slot 622 or 626).

In some embodiments, the Bluetooth transceiver 108 is configured to concurrently operate in accordance with one or more profiles including a hands-free profile, an advance audio distribution profile (A2DP) profile, and a human-interface device (HID) profile. The hands-free profile uses the eSCO link to support conversational audio profile. When operating in accordance with the hand-free profile, the eSCO link is established with the Bluetooth device 110. The eSCO link comprises Bluetooth receiving slots 612 and transmitting slots 614. In these embodiments, a first of the Bluetooth receiving slots in the eSCO period may be a reserved slave-to-master slot and configured for reception of synchronous data, such as conversational audio data. When the reserved slave-to-master slot does not occur within one of the reserved subframes, a subsequent reserved slave-to-master slot associated with a retry window 630 is provided within one of the reserved subframes 504, 506 to allow for retransmission when the prior transmission was unsuccessful.

When operating in accordance with the A2DP profile or the HID profile, the reservation of at least two non-contiguous subframes 504, 506 within each uplink frame 303 provides opportunities of asynchronous communications between the Bluetooth transceiver 108 and the Bluetooth device 110 during one of the reserved subframes 504, 506 without interfering transmissions by the WiMAX transceiver 106. When operating in accordance with the A2DP profile and/or the HID profile, communications between the Bluetooth transceiver 108 and Bluetooth device 110 may be asynchronous communications, such as ACL communications, in which the master device polls and the slave device responds. Based on the traffic throughput demand, the frequency of master polling may be different. In these embodiments, ACL packets that fall within the duration of the reserved subframes may be successfully received. With at least two subframe reservations in every frame 103, sufficient throughput for both the A2DP profile (e.g., for audio streaming) and the HID profile is provided.

Although the Bluetooth transceiver 106 is described herein as being the master device, embodiments are also applicable to the Bluetooth transceiver 106 operating as the slave device. In these embodiments, the Bluetooth transceiver 106 may align its receiving slot boundary to the frame sync signal 105 and the above described usage scenarios can be supported.

Figure 7:
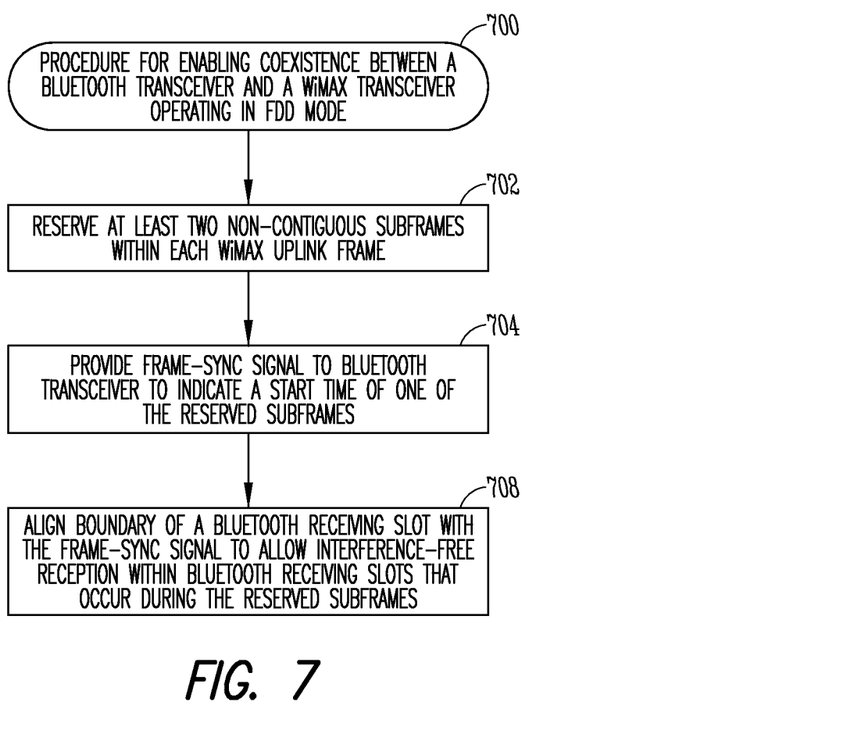
FIG. 7 is a procedure for enabling coexistence of a Bluetooth transceiver and a WiMAX transceiver operating in FDD mode in accordance with some embodiments.

FIG. 7 is a procedure for enabling coexistence of a Bluetooth transceiver and a WiMAX transceiver operating in FDD mode in accordance with some embodiments. Procedure 700 may be performed by a multi-radio communication device, such as multi-radio communication device 104 (FIG. 1) that includes a WiMAX transceiver, such as the WiMAX transceiver 106, and a co-located Bluetooth transceiver, such as the Bluetooth transceiver 108. The WiMAX transceiver 106 may be configured to operate in FDD mode.

In operation 702, the WiMAX transceiver 106 may reserve at least two non-contiguous subframes in each WiMAX uplink frame 103 (FIG. 6). In some embodiments, the WiMAX transceiver 106 may transmit a reservation pattern, such as a bitmap, to the WiMAX base station 102 (FIG. 1). The reservation pattern may indicate which uplink subframes 302 (FIG. 3) of a frame 303 are to be allocated for uplink transmissions and which uplink subframes 302 are to be reserved for no uplink transmissions. An acknowledgement may be provided by the WiMAX base station 102.

In operation 704, the WiMAX transceiver 106 may provide a frame sync signal, such as frame sync signal 105 (FIG. 1), to the Bluetooth transceiver 108 to indicate a start time of one of the reserved subframes, such as subframe 506 (FIG. 6), in each uplink frame.

In operation 706, the Bluetooth transceiver 108 may align a boundary of a receiving slot 612 (FIG. 6) with the frame-sync signal 105 to allow interference-free reception of Bluetooth signals within Bluetooth receiving slots 612 that occur during the reserved subframes 504, 506 (FIG. 6).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-radio communication device comprising a Worldwide Interoperability for Microwave Access (WiMAX) transceiver configured to operate in Frequency-Division Duplex (FDD) mode and a co-located Bluetooth transceiver, wherein the WiMAX transceiver is configured to:
reserve at least two non-contiguous subframes within each uplink frame, each reserved subframe being non-contiguous to all other reserved subframes; and
provide a frame-sync signal to the Bluetooth transceiver to indicate a start time of one of the reserved subframes in each uplink frame,
wherein the Bluetooth transceiver is configured to align a boundary of a receiving slot with the frame-sync signal to allow interference-free reception of Bluetooth signals within Bluetooth receiving slots that occur during the reserved subframes.

2. The multi-radio communication device of claim 1 wherein the WiMAX transceiver is configured to transmit a reservation request to a WiMAX base station to reserve the non-contiguous subframes, and
wherein the at least two subframes that are reserved within each uplink frame are selected to be separated by an odd number of subframes.

3. The multi-radio communication device of claim 2 wherein the reservation of the at least two subframes is periodic and configured to reserve a same corresponding at least two subframes within each uplink frame.

4. The multi-radio communication device of claim 2 wherein the receiving slot that is aligned with the frame-sync signal is one of a plurality of Bluetooth receiving slots that are within an extended Synchronous Connection Oriented (eSCO) period comprising the plurality of Bluetooth receiving slots and a plurality of Bluetooth transmitting slots, wherein a first of the Bluetooth receiving slots in the eSCO period is a reserved receive slot configured for reception of synchronous data, and wherein when the reserved receive slot does not occur within one of the reserved subframes, a subsequent reserved receive slot associated with a retry window is provided within one of the reserved subframes to allow for retransmission.

5. The multi-radio communication device of claim 4 wherein when the reserved receive slot does occur within one of the reserved subframes, the Bluetooth transceiver is to receive synchronous data within the reserved receive slot without interfering transmissions by the WiMAX transceiver.

6. The multi-radio communication device of claim 5 wherein the reservation of the at least two non-contiguous subframes within each uplink frame provides opportunities of asynchronous communications between the Bluetooth transceiver and a Bluetooth device during one of the reserved subframes without interfering transmissions by the WiMAX transceiver.

7. The multi-radio communication device of claim 6 wherein at least some of the opportunities of asynchronous communications occur during the eSCO period and occur after a successful reception of the synchronous data within the reserve receive slot.

8. The multi-radio communication device of claim 4 wherein when operating in the FDD mode, downlink and uplink transmissions between the WiMAX transceiver and the WiMAX base station use separate frequency spectrums, and wherein a frequency range of the uplink transmissions is proximate to an operating frequency of the Bluetooth transceiver potentially resulting in severe interference with concurrent receptions by the Bluetooth transceiver that do not occur during one of the reserved subframes.

9. The multi-radio communication device of claim 8 wherein each uplink frame is within a superframe comprising several equally sized frames, and wherein each uplink frame comprises several equally sized subframes.

10. The multi-radio communication device of claim 5 wherein when operating in FDD mode, the WiMAX transceiver communicates with the WiMAX base station over an FDD communication link comprising an FDD downlink utilizing a FDD downlink frequency range for downlink transmissions and having an FDD uplink utilizing an FDD uplink frequency range for uplink transmissions, and wherein the Bluetooth transceiver communicates with a local Bluetooth device using a Bluetooth frequency range that is significantly closer to the FDD uplink frequency range than the FDD downlink frequency range such that uplink transmissions from the WiMAX transceiver would severely interfere with concurrent receptions by the Bluetooth transceiver.

11. A method performed by a multi-radio communication device that includes a Worldwide Interoperability for Microwave Access (WiMAX) transceiver configured to operate in Frequency-Division Duplex (FDD) mode and a co-located Bluetooth transceiver, the method comprising:

transmitting, by the WiMAX transceiver, a reservation request to reserve at least two non-contiguous subframes within each of a plurality of uplink frames, wherein each reserved subframe is non-contiguous to all other reserved subframes;

providing a frame-sync signal to the Bluetooth transceiver to indicate a start time of one of the reserved subframes in each uplink frame; and aligning, by the Bluetooth transceiver, a boundary of a receiving slot with the frame-sync signal to allow interference-free reception of Bluetooth signals within Bluetooth receiving slots that occur during the reserved subframes.

12. The method of claim 11 wherein the at least two subframes that are reserved within each uplink frame are selected to be separated by an odd number of subframes.

13. The method of claim 12 wherein the receiving slot that is aligned with the frame-sync signal is one of a plurality of Bluetooth receiving slots that are within an extended Synchronous Connection Oriented (eSCO) period comprising the plurality of Bluetooth receiving slots and a plurality of Bluetooth transmitting slots, wherein a first of the Bluetooth receiving slots in the eSCO period is a reserved receive slot configured for reception of synchronous data, and wherein when the reserved receive slot does not occur within one of the reserved subframes, a subsequent reserved receive slot associated with a retry window is provided within one of the reserved subframes to allow for retransmission.

14. A multi-radio communication device comprising a broadband wireless access network (WAN) transceiver and a co-located Bluetooth transceiver, wherein the BWAN transceiver is configured to transmit a reservation request to a BWAN base station to reserve an amount of time during which no uplink transmissions are scheduled, the reservation request to allow the Bluetooth transceiver to receive packets from a Bluetooth device without interference from transmissions by the BWAN transceiver;

wherein as part of the reservation request, the BWAN transceiver reserves at least two non-contiguous subframes within each uplink frame and provide a frame-sync signal to the Bluetooth transceiver to indicate a start time of one of the reserved subframes in each uplink frame, wherein each reserved subframe is non-contiguous to all other reserved subframes; and wherein the Bluetooth transceiver is configured to align a boundary of a receiving slot with the frame-sync signal to allow interference-free reception of Bluetooth signals within Bluetooth receiving slots that occur during the reserved subframes.

15. The multi-radio communication device of claim 14 wherein the Bluetooth transceiver is configured to concurrently operate in accordance with two or more profiles including a hands-free profile that uses an extended Synchronous Connection Oriented (eSCO) link to support conversational audio, an advance audio distribution profile (A2DP) profile, and a human-interface device (HID) profile.

16. The multi-radio communication device of claim 15 wherein when operating in accordance with the hand-free profile, the eSCO link is established with the Bluetooth device, the eSCO link comprising a plurality of Bluetooth receiving slots and transmitting slots, wherein a first of the Bluetooth receiving slots in an eSCO period is a reserved receive slot configured for reception of synchronous data, and wherein when the reserved receive slot does not occur within one of the reserved subframes, a subsequent reserved receive slot associated with a retry window is provided within one of the reserved subframes to allow for retransmission.

17. The multi-radio communication device of claim 15 wherein when operating in accordance with either the A2DP profile or the HID profile, the reservation of the at least two non-contiguous subframes within each uplink frame provides opportunities of asynchronous communications between the Bluetooth transceiver and a Bluetooth device during one of the reserved subframes without interfering transmissions by the BWAN transceiver.

18. The multi-radio communication device of claim 14 wherein the BWAN transceiver is a Worldwide Interoperability for Microwave Access (WiMAX) transceiver configured to operate in Frequency-Division Duplex (FDD) mode in accordance with one of the IEEE 802.16 standards using an orthogonal frequency division multiple access (OFDMA) communication technique.

19. The multi-radio communication device of claim 14 wherein the BWAN transceiver is a $3^{rd}$ Generation Partnership Project (3GPP) Universal Terrestrial Radio Access Network (UTRAN) Long-Term-Evolution (LTE) transceiver configured to operate in accordance with one of the 3GPP UTRAN standards for LTE using an Frequency-Division Duplex (MD) orthogonal frequency division multiple access (OFDMA) communication technique.

\* \* \* \* \*

UNITED STATES PATENT AND TRADEMARK OFFICE
CERTIFICATE OF CORRECTION

| | | |
|---|---|---|
| PATENT NO. | : 8,553,592 B2 | Page 1 of 1 |
| APPLICATION NO. | : 12/425795 | |
| DATED | : October 8, 2013 | |
| INVENTOR(S) | : Xue Yang | |

It is certified that error appears in the above-identified patent and that said Letters Patent is hereby corrected as shown below:

In the Claims

In column 9, line 58, in claim 11, delete "co-located." and insert --co-located--, therefor In column 10, line 24, in claim 14, delete "(WAN)" and insert --(BWAN)--, therefor In column 11, line 18, in claim 19, delete "(MD)" and insert --(FDD)--, therefor Signed and Sealed this
Eighteenth Day of November, 2014

Michelle K. Lee
*Deputy Director of the United States Patent and Trademark Office*